(12) United States Patent
Corredor et al.

(10) Patent No.: US 12,130,800 B2
(45) Date of Patent: Oct. 29, 2024

(54) CONTENT PROCESSING DATA INGESTION PIPELINE MONITORING AND MANAGEMENT SYSTEM

(71) Applicant: Microsoft Technology Licensing, LLC, Redmond, WA (US)

(72) Inventors: Charlie Corredor, Seattle, WA (US); Mengdong Yang, Sammamish, WA (US); Christoffer Benjamin Rosen, Seattle, WA (US); Varadarajan Subramaniam Thiruvillamalai, Bellevue, WA (US); Shijie Ma, Bellevue, WA (US); Thottam R. Sriram, Redmond, WA (US); Sarosh Anwar, Redmond, WA (US); Shashi Rekha Singaravel, Sammamish, WA (US); Robin M. Thomas, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/089,316

(22) Filed: Dec. 27, 2022

(65) Prior Publication Data
US 2024/0211463 A1 Jun. 27, 2024

(51) Int. Cl.
*G06F 16/23* (2019.01)
*G06F 16/215* (2019.01)

(52) U.S. Cl.
CPC ........ *G06F 16/2365* (2019.01); *G06F 16/215* (2019.01)

(58) Field of Classification Search
CPC ...... G06F 18/217; G06F 16/2379; G06F 8/71; G06F 16/25; G06F 16/27; G06F 3/0619; G06F 16/254; G06F 16/2365; G06F 3/0647; G06F 3/0653; G06F 11/2082; G06F 16/273
See application file for complete search history.

(56) References Cited

U.S. PATENT DOCUMENTS

2022/0188324 A1* 6/2022 Ramesh ................ G06F 16/258
2022/0374442 A1* 11/2022 Kaspa .................. G06F 16/2282

* cited by examiner

*Primary Examiner* — Hau H Hoang
(74) *Attorney, Agent, or Firm* — Schwegman Lundberg & Woessner, P.A.

(57) ABSTRACT

Systems and methods are directed to monitoring and managing a health of a content processing data ingestion pipeline. In example embodiments, a plurality of content elements are ingested from a source to a destination through the ingestion pipeline, whereby the ingestion pipeline comprises a plurality of nodes between the source and the destination. A data management system detects a gap in the ingestion pipeline. The gap indicates a difference associated with a content element of the plurality of content elements between a first node and a second node of the ingestion pipeline. In response to detecting the gap, the data management system automatically triggers reingesting of the content element from the first node. The data management system also determines, based on monitoring of the ingestion pipeline, the health of the ingestion pipeline and provides a dashboard that graphically represents the health.

20 Claims, 7 Drawing Sheets

CONTENT PROCESSING DATA INGESTION PIPELINE MONITORING AND MANAGEMENT SYSTEM

TECHNICAL FIELD

The subject matter disclosed herein generally relates to content processing data ingestion through an ingestion pipeline. Specifically, the present disclosure addresses systems and methods that monitor content element movement through the ingestion pipeline and automatically triggers reingestion of content elements when index gaps are detected in the ingestion pipeline.

BACKGROUND

Currently, to assess system ingestion health of an ingestion pipeline, there are no standard methodologies or calculations to ensure system performance that will impact end-user search experiences. From a product perspective, there are system expectations regarding data reliability that the content ingestion process should meet. Data reliability corresponds to an ability to have a complete and accurate set of information after an operation, which refers to system ingestion. To meet data reliability, a system ingestion pipeline should ensure a one-to-one mapping for every content element from a source into an index in a search destination. For example, if there are 1000 content elements (e.g., documents, sites, folders) in the source, but only 999 queryable items in the destination, it can be assumed that the system has 99.9% completeness health.

BRIEF DESCRIPTION OF THE DRAWINGS

Some embodiments are illustrated by way of example and not limitation in the figures of the accompanying drawings.

DETAILED DESCRIPTION

Figure 1:
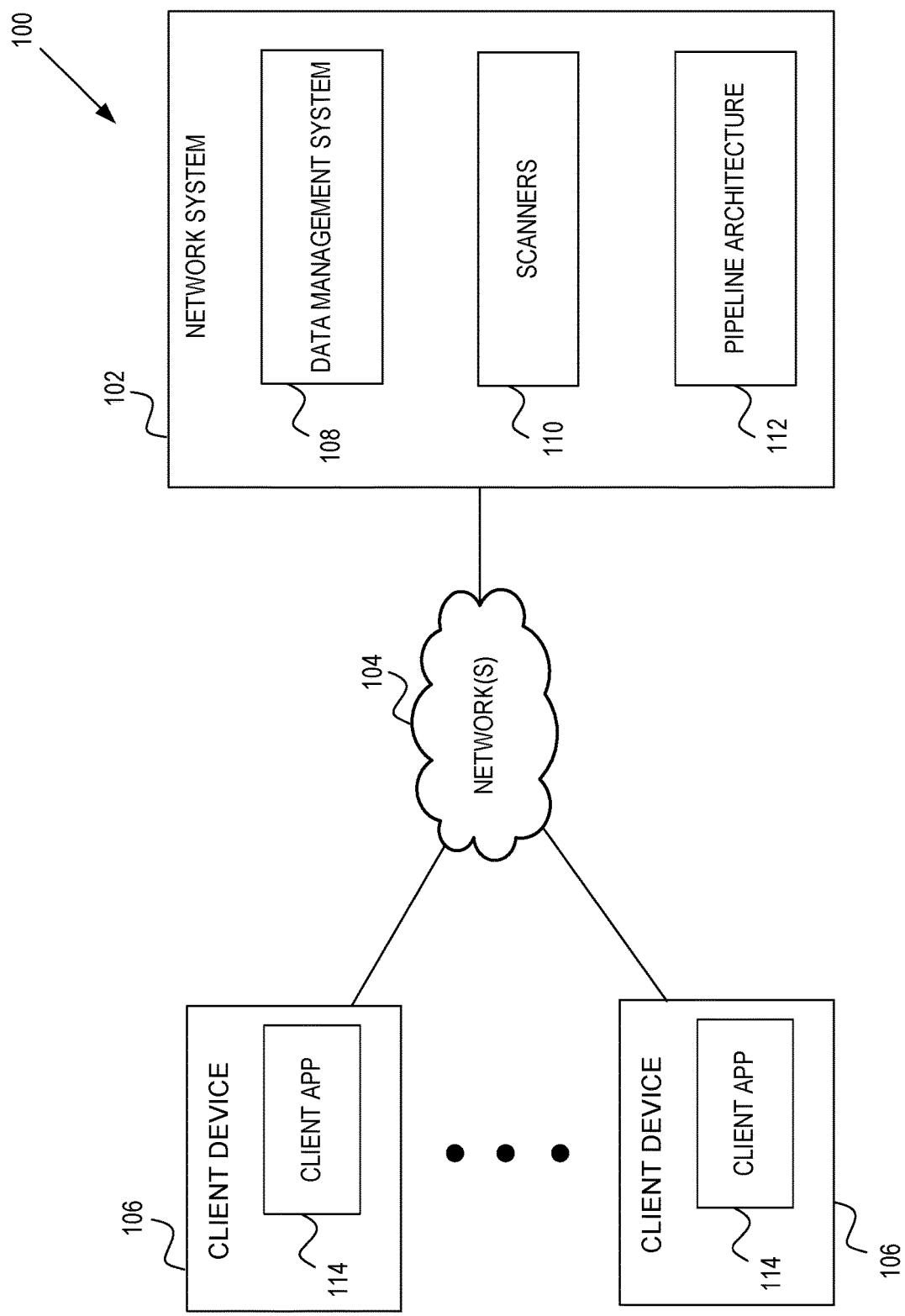
FIG. 1 is a diagram illustrating a network environment suitable for monitoring and managing an ingestion pipeline, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

To transfer data, a back-end multi-level content processing data ingestion system or pipeline may be used to extract queryable information from content elements (e.g., documents, sites, folders) and index them. As an example, indexing refers to a process of extracting queryable data from the content elements for search functionalities. The goal of the ingestion pipeline comprises converting content elements into indexable items hosted in the destination that can be searched. To convert content elements into indexable items, the ingestion pipeline crawls and extracts queryable data from the source, ingests the data, allocates proper indexes, and hosts the items at the destination for search queries. Thus, the ingestion pipeline comprises a system that converts content elements into queryable items.

In order to have an effective searchable platform, the ingestion pipeline should ensure a one-to-one mapping for every source content element in an index at the destination (e.g., in a destination storage), which is referred to herein, for example, as completeness or data reliability. For example, assuming there are 1000 content elements in the source, but only 999 queryable items in the destination storage, the system can assume that the system has 99.9% completeness.

Completeness measures content element ingestion consistency from a source against a destination. In some cases, completeness may be calculated as a ratio of a total number of content elements at the source over a total number of content elements at the destination at a given time, as shown below.

$$\text{Item Count Completness} = \left( \frac{\text{Total Items}_{[Source]}}{\text{Total Items}_{[Destination]}} \right) \quad (1)$$

Item Count Completeness corresponds to a value of items that consistently (or inconsistently) transferred from the source to the destination for a specific system stack layer. In one embodiment, the ingestion pipeline may comprise several stack layers (e.g., from the source to a primary storage and from the primary storage to a secondary storage). The Total Items$_{(Source)}$ represents a sum of content elements at the source, and the Total Items$_{(Destination)}$ is a sum of content elements at the destination.

The item count completeness calculation approach encapsulates the assumption that content elements had enough time to be transferred from the source to the destination. In addition, the item count completeness equation (1) above does not consider missing items (e.g., items in the source that cannot be found at the destination), potential content element updates that can create versioning mismatch, and time delays during the data transfer from source to destination. Given these gaps in the item count completeness calculation approach, an alternative approach to measure and report completeness would be useful.

In example embodiments, item-to-item comparison between the source and destination can be employed to calculate completeness at each ingestion stack layer and, potentially, evaluate an overall (end-to-end) system ingestion health. Equation 2 shows Item Comparison Completeness to calculate content element consistency and inconsistency through the ingestion process.

$$\text{Item Comparison Completness} = \frac{\sum_t (\text{Missing Items} + \text{Version Mismatch Items} + \text{Missing Delete Items})}{\sum_t (\text{Items}_{source} + (\text{Missing Delete Items}))} \quad (2)$$

Where Missing Items corresponds to the content elements that exist in the source but not in the destination, Version Mismatch Items relates to items in both source and destination with different versions, Missing Delete Items are items in the destination but not in the source, $\text{Items}_{Source}$ is the sum of detected items at the source, and t represents the time interval when the measurement took place. For item comparison completeness, it is necessary to initially calculate across all content and at a tenant level. This approach gives optics on how the ingestion pipeline is able to transfer data reliably at tenant level and across all content.

Additionally, completeness can be calculated at each system stack layer (e.g., each node of the ingestion pipeline) and reported separately. Since the completeness calculations are based on the previous stack layer for its evaluation and each component is reporting its metrics separately, a unified dashboard that reports completeness at each stack layer is desirable. The dashboard can display completeness levels for the overall ingestion pipeline, provides an in-depth view of completeness at each stack layer, and shows a system health on a user interface.

Example embodiments provide a network system that includes the ingestion pipeline and a data management system that monitors the health of the ingestion process and provides a completeness dashboard. Specifically, the network system monitors for index gaps which indicate that a content element is not found between the different stack layers or from the source to the destination. When an index gap is detected, the network system automatically triggers the ingestion pipeline to reingest the content element.

As a result, example embodiments provide a technical solution for monitoring a health of the ingestion pipeline of a platform and increasing completeness of the index at the destination. The technical solution includes scanning the source and destination and comparing the scans to determine overall completeness and accessing index logs associated with each content item to detect index gaps. In response to detecting an index gap, the system automatically reingests the missing or mismatched content element. As a result, one or more of the methodologies described herein facilitate solving the technical problem of monitoring and increasing completeness of the ingestion pipeline.

FIG. 1 is a diagram illustrating a network environment 100 suitable for monitoring and managing an ingestion pipeline, in accordance with example embodiments. A network system 102 is communicatively coupled, via a network 104, to a plurality of client devices 106. In some embodiments, the network system 102 is associated with a subscriber system such as, for example, Microsoft 365. The subscriber system can comprise a cloud-based software-as-a-service (SaaS) system that provides a plurality of applications that generate, edit, and display documents.

The network system 102 comprises a data management system 108 that calculates completeness, detects index gaps, triggers reingestion of content elements, and generates completeness dashboards. In order for the data management system 108 to calculate completeness, the data management system 108 receives scans from one or more scanners 110. In example embodiments, the scanners 110 scan a source and a destination of a pipeline architecture 112 that is ingesting content elements from the source through the ingesting pipeline and indexing the content elements at the destination resulting in a searchable index. The pipeline architecture 112 will be discussed in more detail in connection with FIG. 2 below, and the data management system 108 will be discussed in more detail in connection with FIG. 3 below.

Each client device 106 is a device of a user of the network system 102. The client devices 106 may comprise, but are not limited to, a smartphone, tablet, laptop, multi-processor systems, microprocessor-based or programmable consumer electronics, game consoles, set-top boxes, a server, or any other communication device that can perform operations with respect to the network system 102 via the network 104. The operations can include, for example, generating, editing, searching, and viewing content elements associated with the network system 102.

In example embodiments, each client device 106 comprises one or more client applications 114 that communicates with the network system 102 for added functionality. For example, the client application 114 may be a local version of an application or component of the network system 102. Accordingly, the client application 114 allows a user to create, edit, search, and display content elements on the client device 106. The added functionality provided to the client application 114 by the network system 102 includes, for example, cloud-based storage of content elements and searching capabilities of content elements and applications at the network system 102.

Depending on the form of the client devices 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated In example embodiments, any of the systems, devices, or applications (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of client devices 106 may be embodied within the network environment 100. While only a single network system 102 is shown, alternative embodiments contemplate having more than one network system 102 to perform the operations discussed herein (e.g., each localized to a particular region).

Figure 2:
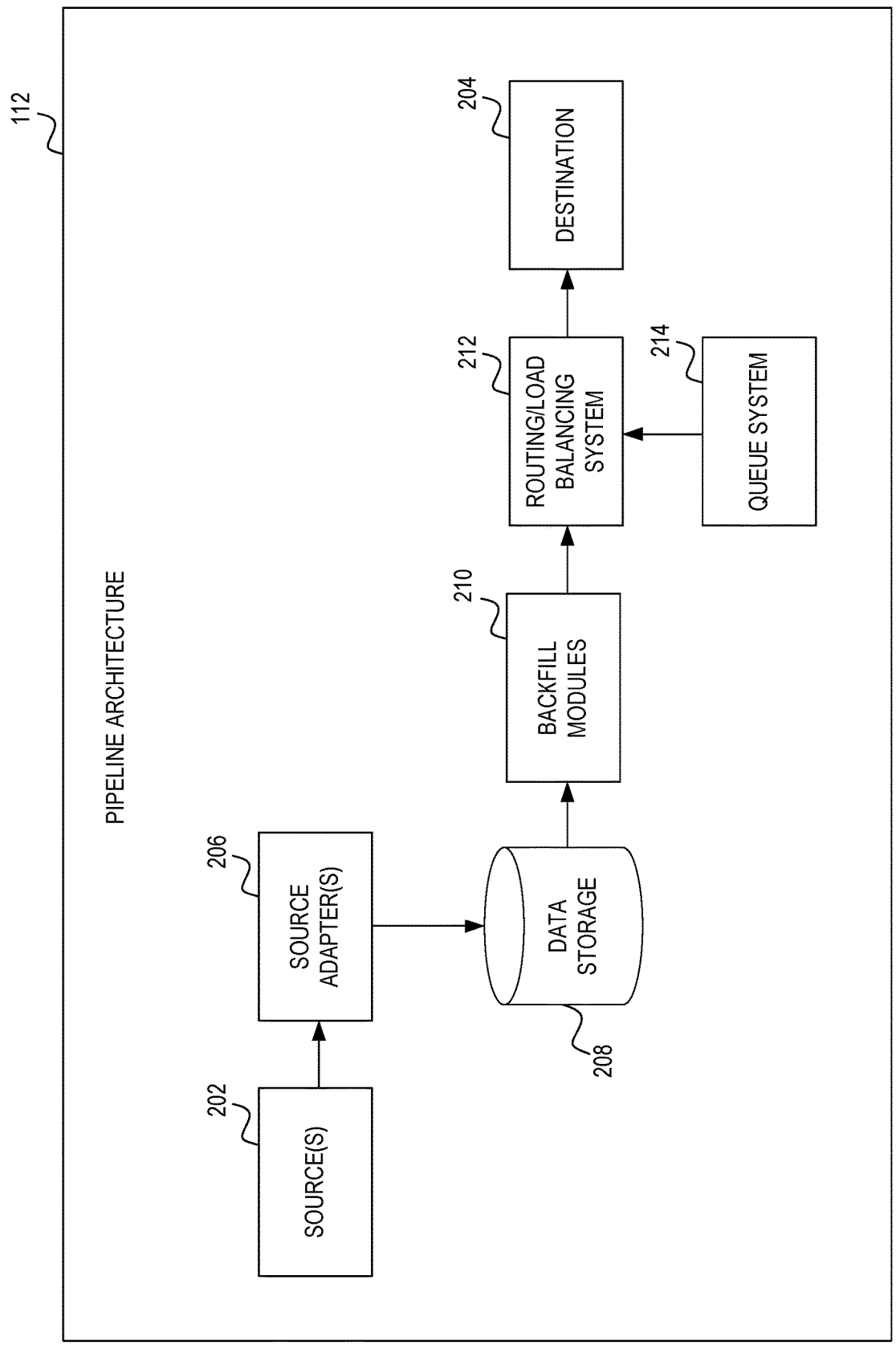
FIG. 2 is a diagram illustrating components of a pipeline architecture, according to some example embodiments.

FIG. 2 is a diagram illustrating components of the pipeline architecture 112, according to some example embodiments. The pipeline architecture 112 comprises the ingestion pipeline and is configured to ingest content elements from a source 202 and create an index of corresponding items at a destination 204. As such, "pipeline architecture" and "ingestion pipeline" are used interchangeably herein. To enable these operations, the pipeline architecture 112 comprises a plurality of components including the sources 202, source adapter(s) 206, data storage 208, backfill module(s) 210, routing/load balancing system 212, a queue system 214, and the destination 204. In accordance with example embodiments, each of the components shown on FIG. 2 and/or their respective subcomponents (as will be discussed below) comprises a stack layer or node (used interchangeably) in the pipeline architecture 112. Alternative embodiments may comprise more or less components, combine the functions of some these components into a single component, or making some components optional.

In example embodiments, the source 202 comprise sites associated with a cloud-based service of the network system 102. The cloud-based service may help organizations (e.g., tenants) share and collaborate by hosting internal sites, documents, and other information for personal and enterprise use. In some cases, the source 202 may include or be associated components which parse content elements from the internal sites. Additionally, the source 202 may include or be associated with a component that stores raw content (e.g., content elements) in a single data storage which can be searchable.

The source adapters 206 accesses the raw data and adapts the raw content for storage into the data storage 208. For example, the source adapters 206 parse and push content element index changes that occur at the source 202. In some embodiments, the data storage 208 comprises a plurality of primary (site) storages.

In example embodiments, the backfill modules 210 may comprise one or more crawlers and search processors. In example embodiments, the crawlers transfer old indexes to the destination 204 to ensure data reliability between the source 202 and the destination 204.

After the backfill modules 210, the ingestion pipeline moves to components that have the ability to control the flow. Because the pipeline architecture 112 continuously pipes or passes information or content through the ingestion pipeline, the pipeline architecture 112 benefits from some types of control. Thus, the routing/load balancing system 212 routes and load balances the content elements while the queue system 214 queues and forwards the content elements.

At the end of pipeline architecture 112 is the destination 204. In example embodiments, the destination 204 comprises a plurality of data storage that store searchable indexes of items. Items are the output of indexing that is hosted on the destination. The search indexes each comprises a binary structure that is used to store data for search functionality. As a result, a queries platform is able to extract or call these search indexes for an end user at the client device 106 in order to search the content.

While FIG. 2 shows a specific version of the pipeline architecture 112, example embodiments of the present invention will operate with other versions of a pipeline architecture 112. For example, more or less components may be embodied in the pipeline architecture 112.

Figure 3:
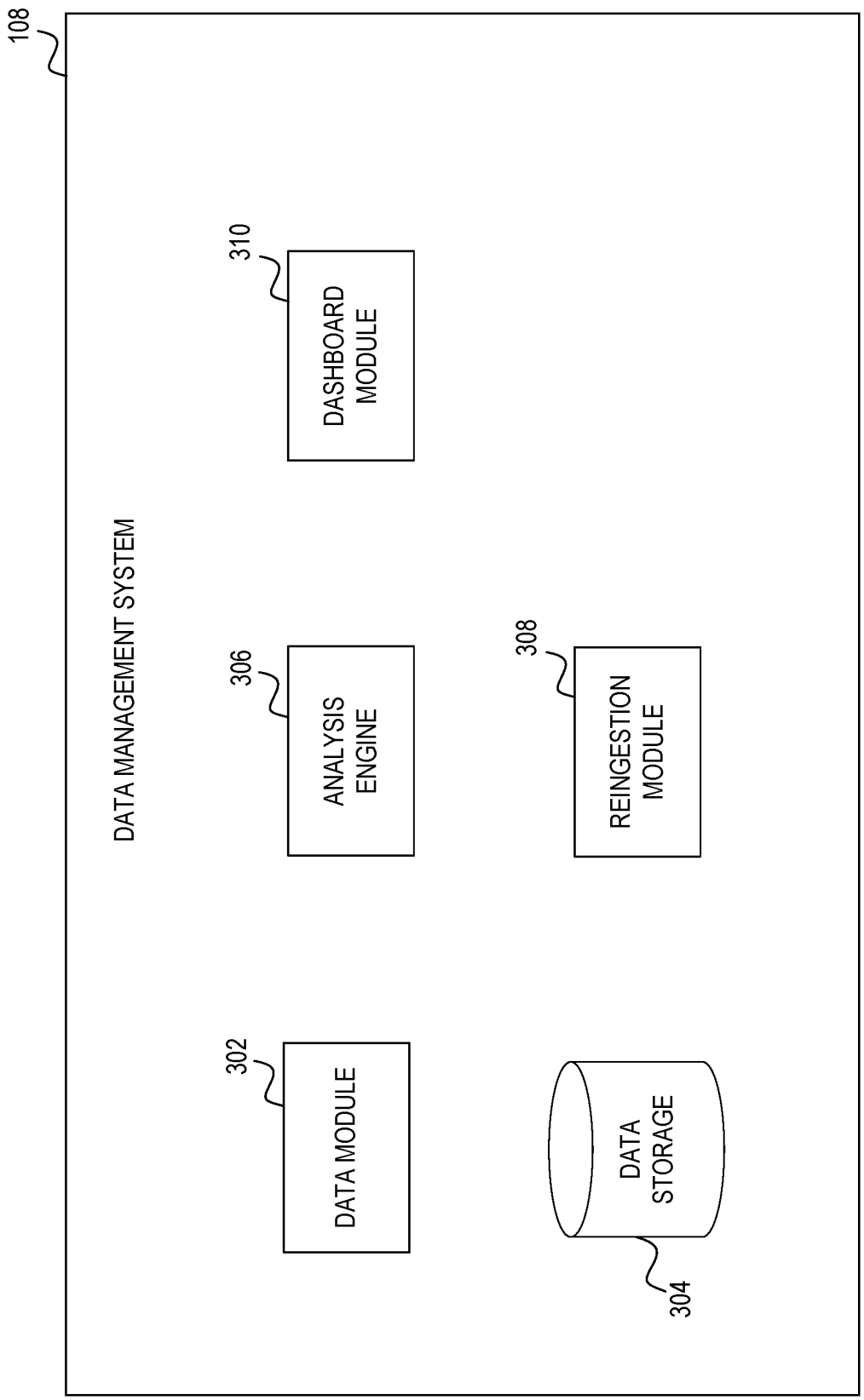
FIG. 3 is a diagram illustrating components of a data management system, according to some example embodiments.

FIG. 3 is a diagram illustrating components of the data management system 108, according to some example embodiments. The data management system 108 is configured to calculate completeness, determines index gaps, trigger components of the pipeline architecture 112 to reingest content elements associated with an index gap, and generate completeness dashboards. To enable these operations, the data management system 108 comprises a data module 302, a data storage 304, an analysis engine 306, a reingestion module 308, and a dashboard module 310.

The data module 302 accesses scans from the scanners 110 and index logs from the pipeline architecture 112. The scans from the scanners 110 comprise scans of the content elements at the source 202 and scans of the items from the destination 204. The index logs comprise "breadcrumbs" associated with each content element as it travels through the ingestion pipeline. The breadcrumbs allows the data management system 108 to track a content element through the ingestion pipeline. In example embodiments, the breadcrumb can include a time stamp every time the content element enters and exits a component of the pipeline architecture 112 and/or provide an indication of any operations associated with the content element (e.g., received, sent to next layer). In some cases, the breadcrumb can also capture a version number of the content element. In some embodiments, the index logs are per content element. The scans and/or index logs can be stored to the data storage 304.

The analysis engine 306 is configured to analyze the scans and index logs to determine completeness and detect whether an index gap exists. In various embodiments, the analysis engine 306 accesses (e.g., from the data storage 304) the scans of the content elements at the source 202 and the destination 204 and compares the scans to detect if there is a gap. The gap may indicate a content element that exist in the source 202 but not in the destination 204 (e.g., a missing item), a content element in both the source 202 and the destination 204 with different versions (e.g., a version mismatch item), or content elements in the destination 204 but not at the source 202 (e.g., a missing deleted item).

Further still, the analysis engine 306 accesses (e.g., from the data storage 304) the index logs that tracks the movement of content elements through the ingestion pipeline. The analysis engine 306 examines the logs to detect if an index gap exists for each content element that is progressing (or has progressed) through the ingestion pipeline. As with the index gap from the comparison of the scans, the index gap from the logs can indicate that a content element is present in a first node and missing in the second node (e.g., a missing item), that a version of the content element at the first node is different from a version of the content element at the second node (e.g., a version mismatch item), or that the content element is deleted at the first node but still present at the second node (e.g., a missing deleted item).

Furthermore, the analysis of the scans and index logs by the analysis engine 306 results in an item comparison completeness calculation that indicates a health of the content processing data ingestion pipeline (e.g., the pipeline architecture 112). For instance, the analysis engine 306 can apply the data to equation (1) and/or equation (2) above to determine the item count completeness and/or the item comparison completeness that indicates a health of the content processing data ingestion pipeline.

Based on the analysis by the analysis engine 306, the reingestion module 308 may trigger a component of the pipeline architecture 112 to reingest a content element. For instance, if the comparison of the scans indicates an index gap for a content element, then the reingestion module 308 triggers the reingestion of the content element from the source 202. As another example, if the analysis of the index logs indicates an index gap occurring between intermediate nodes or stack layers of the ingestion pipeline, then the reingestion module 308 triggers a reingestion process of the content element from a first of the two intermediate nodes. For instance, if an index gap is detected for a content element between the routing/load balancing system 212 and the destination 204, then the reingestion module 308 triggers the reingestion of the content item from the routing/load balancing system 212. By triggering reingestion from the component immediately before the detected index gap, the reingestion process is more efficient since reingestion does not occur from the source 202 at the beginning of the ingestion pipeline. In various embodiments, the reingestion module 308 triggers the reingestion of the content item by transmitting instructions or commands to the affected component of the pipeline architecture 112 to perform the reingestion process for the content element.

The dashboard module 310 is configured to manage the generation and display of various dashboard user interfaces. In example embodiments, the results of the analysis by the analysis engine 306 (e.g., the item count completeness, the item comparison completeness) are accessed by the dashboard module 310. The dashboard module 310 then generates the dashboard user interfaces, which presents the results graphically.

Figure 4:
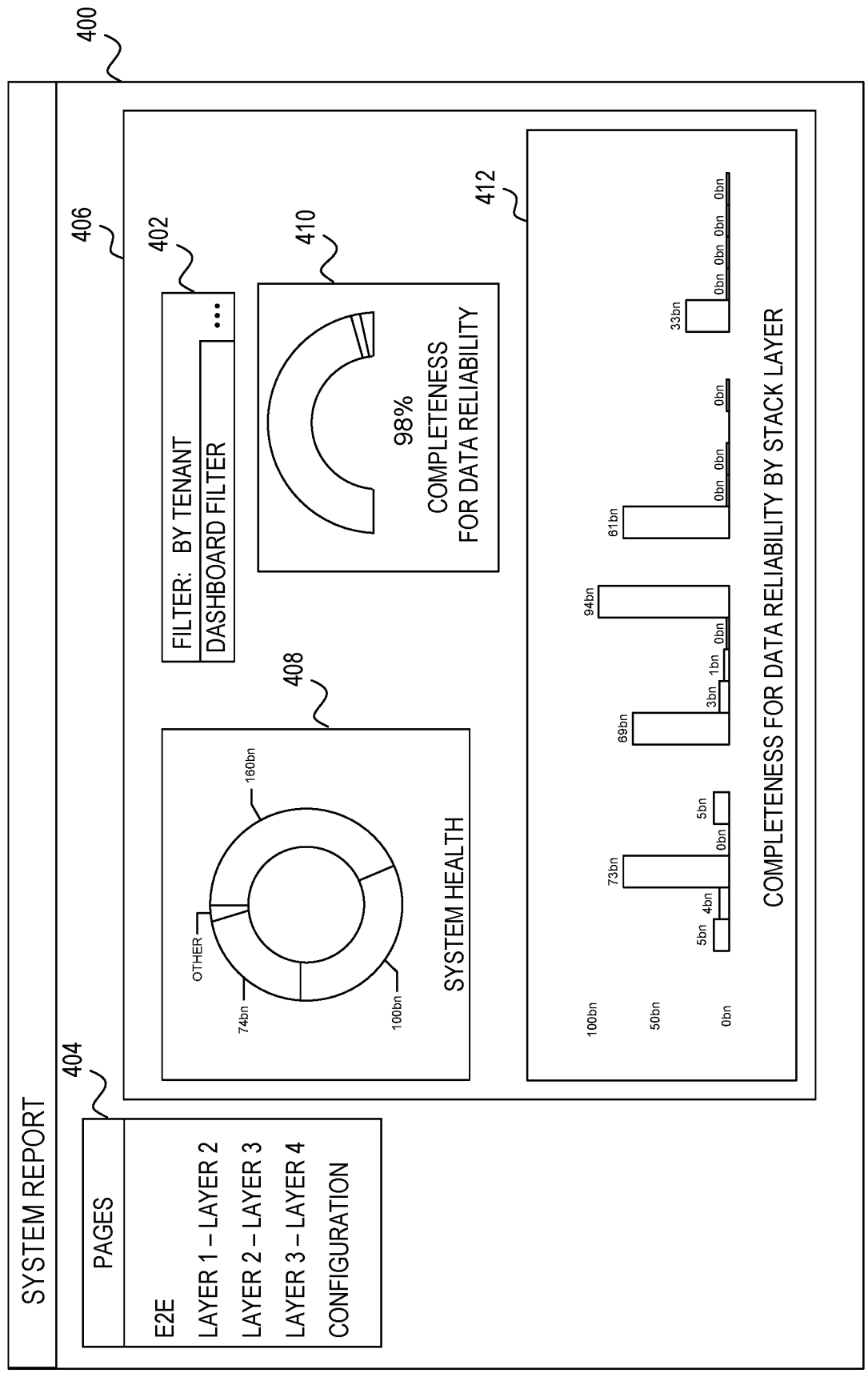
FIG. 4 is an example screenshot of a dashboard illustrating completeness between nodes of the ingestion pipeline, according to some example embodiments.

FIG. 4 is an example screenshot of a dashboard user interface (UI) 400 illustrating completeness between nodes of the ingestion pipeline or pipeline architecture 112, according to some example embodiments. The dashboard UI 400 can be presented (e.g., filtered) by tenant (e.g., a customer of the network system 102). For instance, a user (e.g., an administrator) can select the filter in a dashboard filter field 402. Other filters can include, for example, geo-location, index classification, and source type.

The example dashboard UI 400 includes pages section 404 which allows the user to select different pages to display in a page section 406. The pages include different completeness results between different nodes or stack layers of the pipeline architecture 112, whereby each set of completeness results may be presented in a different page of the dashboard UI 400. For example, the user can select "E2E" to view completeness results for end-to-end of the pipeline architecture 112 (e.g., results for source 202 to destination 204). Similarly, the user can select to view the page completeness results indicating health of the ingestion pipeline between each node/stack layer of the pipeline architecture 112. As shown in FIG. 4, the user can select, for example, to view page completeness results for stack layer 1 to stack layer 2, stack layer 2 to stack layer 3, and so forth. The pages shown in FIG. 4 are merely examples and alternative embodiments may include other types of pages and/or completeness results between other components of the pipeline architecture 112.

Assuming the selection of the E2E page, the page section 406 shows overall completeness for the end-to-end pipeline architecture 112. In a first portion 408 of the page section 406, system health for the pipeline architecture 112 is shown broken down by components (e.g., node or stack layer). In a second portion 410, the overall completeness percentage for data reliability for the end-to-end pipeline architecture 112 is graphically indicated (e.g., 98%).

Because there may be subcomponents within each node or stack layer of the pipeline architecture 112, each stack layer can be broken down by their respective subcomponents. A third window 412 displays completeness for data reliability by stack layer by illustrating completeness by subcomponents of each stack layer.

It is noted that the dashboard UI 400 is merely an example and that alterative embodiments may display a user interface with different content in different windows and/or with a different layout. Further still other forms of graphical representations of the results can be used (e.g., bar graphs, pie charts, matrices).

Figure 5:
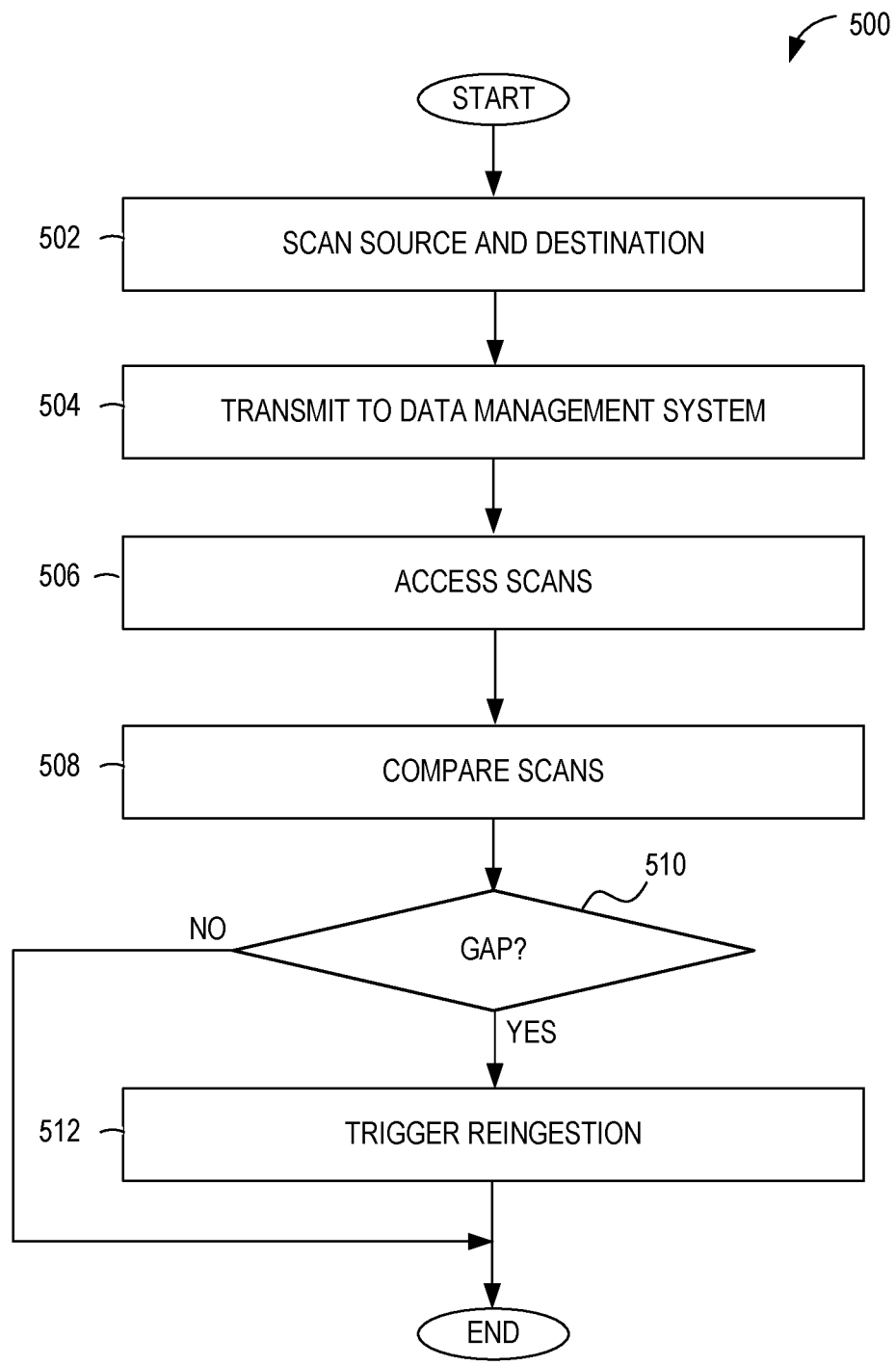
FIG. 5 is a flowchart illustrating operations of a method for monitoring the ingestion pipeline between a source and destination, according to some example embodiments.

FIG. 5 is a flowchart illustrating operations of a method 500 for monitoring the ingestion pipeline between a source and destination, according to some example embodiments. Operations in the method 500 may be performed by the network system 102 described above with respect to FIG. 1-FIG. 3. Accordingly, the method 500 is described by way of example with reference to components in the network system 102. However, it shall be appreciated that at least some of the operations of the method 500 may be deployed on various other hardware configurations or be performed by similar components residing elsewhere in the network environment 100. Therefore, the method 500 is not intended to be limited to these components.

In operation 502, the scanners 110 scan the two ends of the pipeline architecture 112—namely the source 202 and the destination 204. Scanning can be performed at any time, be performed at predetermined times, be triggered by an event (e.g., when a certain amount of data has been ingested), be triggered manually, or based on some other factor. Each scan comprises a snapshot of a state at the component (e.g., the source 202, the destination 204). The scanner 110 then transmits the scans to the data management system 108 (e.g., the data module 302) in operation 504.

In operation 506, the data management system 108 (e.g., the analysis engine 306) access (e.g., obtains, receives, retrieves) the scans received from the scanners 110. In some embodiments, the scans are stored (e.g., in data storage 304) and accessed at a later time. In other embodiments, the scans may be accesses in real-time and immediately analyzed by the data management system 108. In these embodiments, the scan may not need to be stored.

In operation 508, the analysis engine 306 of the data management system 108 analyzes the scans. In example embodiments, the analysis engine 306 compares the snapshot of the state of the source 202 to the snapshot of the state of the destination 204 to identify where there are any index gaps. An index gap may indicate a content element that exists in the source 202 but not in the destination 204 (e.g., a missing item), a content element in both the source 202 and the destination 204 with different version numbers (e.g., a version mismatch item), or content elements in the destination 204 but not at the source 202 (e.g., a missing deleted item).

In operation 510, a determination is made whether any index gaps are detected. If an index gap is detected, then the reingestion module 308 triggers reingestion of the content element associated with the index gap in operation 512. In example embodiments, the reingestion is performed from the source 202. The reingestion occurs for every index gap that is identified. If an index gap is not detected in operation 510 or after triggering reingestion in operation 512, the method 500 ends.

Figure 6:
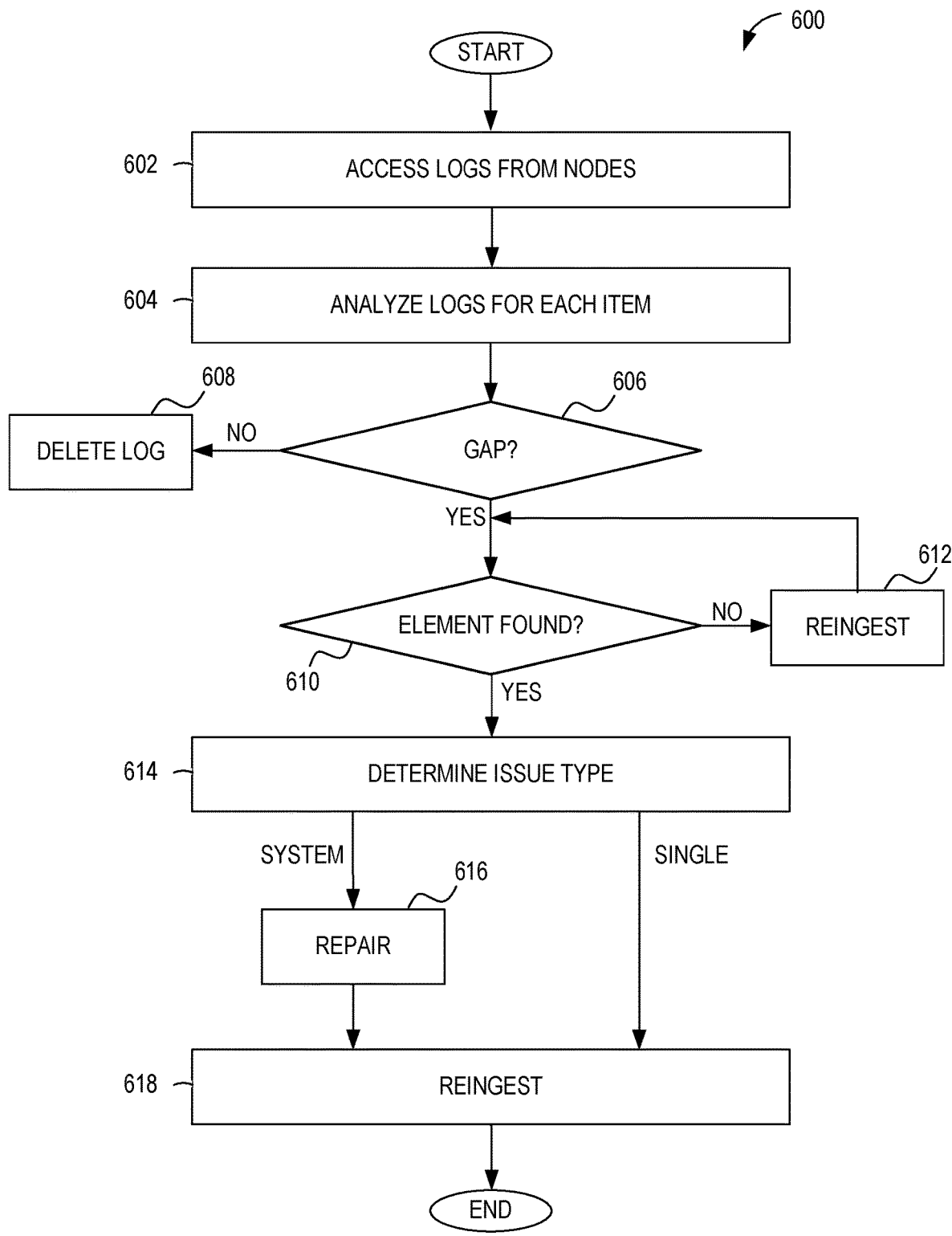
FIG. 6 is a flowchart illustrating operations of a method for monitoring content element ingestion between nodes of the ingestion pipeline, according to some example embodiments.

FIG. 6 is a flowchart illustrating operations of a method 600 for monitoring content element ingestion between nodes of the ingestion pipeline, according to some example embodiments. Operations in the method 600 may be performed by the network system 102 described above with respect to FIG. 2 and FIG. 3. Accordingly, the method 600 is described by way of example with reference to these components in the network system 102. However, it shall be appreciated that at least some of the operations of the method 600 may be deployed on various other hardware configurations or be performed by similar components residing elsewhere in the network environment 100. Therefore, the method 600 is not intended to be limited to these components.

In operation 602, the data management system (e.g., data module 302) accesses index logs associated with the nodes or stack layers of the pipeline architecture 112. The index logs comprise "breadcrumbs" associated with each content element as it travels through the ingestion pipeline. The breadcrumb can include a time stamp every time a content element enters and exits a component of the pipeline architecture 112 and/or provide an indication of any operations associated with the content element (e.g., received, attempted to send to a next layer, sent to next layer successfully). In some cases, the breadcrumb can also capture a version number of the content element. In some embodiments, each index log is per content element.

In operation 604, the index logs are analyzed by the analysis engine 306. For instance, if the log indicates that a particular node or layer has received a content element but has not sent the content element out, then the analysis engine 306 detects a problem within the node. As another example, if a first node indicates it has sent a content element out, but the next node does not have a "grab" or "receive" breadcrumb in the log, this indicates that the next node has not received the content element. Here, the analysis engine 306 determines that the content element was lost between the two nodes. Thus, the analysis engine 306 can track when a content element has been lost.

For versions analysis, the analysis engine 306 can track when a content element has a version change and/or how recent the versioning happened along the different nodes via the logs. Thus, the analysis engine 306 can detect a version mismatch between nodes based on the log.

In operation 606, the analysis engine 306 determines whether an index gap is detected. The index gap indicates that from a first node to a second node, "something" is not the same (e.g., missing content element, version mismatch, missing deleted content element). If no index gap is detected, then the corresponding log is deleted in operation 608. Advantageously, deletion of the log upon determination that no index gap is detected saves on storage and reduce the need for storage capacity. However, if an index gap is detected, then a determination is made by the analysis engine 306, in operation 610, whether the content element is found.

If the content element is not found, this indicates a missing content element. As such, the reingestion module 308 triggers reingestion of the content element in operation 612. For example, the reingestion module 308 triggers a reingestion process from a first node (e.g., indicating existence of the content element) to a second node (e.g., indicating absence of the content element). Here, the first node may be referred to as a source of the reingestion.

If the content element is found in operation 610, the analysis engine 306 determines what type of issue has occurred in operation 614. Issue types can include a system issue and a single issue. A system issue signifies that a component or machine associated with the ingestion pipeline is down. A single issue indicates that a different version exists or that a deleted item in a first node has not been deleted in a subsequent second node.

Assuming the issue type is system-based, the component or machine is repaired in operation 616. In these cases, the analysis engine 306 may automatically generate and transmit an alert or notification to a further system to perform the repair. After the repair, the method 600 proceeds to operation 618 where the content element is reingested from the first node.

Alternatively, if the issue type is a single issue, the method 300 simply proceeds to in operation 618 and the content element is reingested from the first node. In some embodiments, the corresponding index log can be deleted at this point, while in other embodiments, the log may be maintained to keep track of index gap occurrences.

Figure 7:
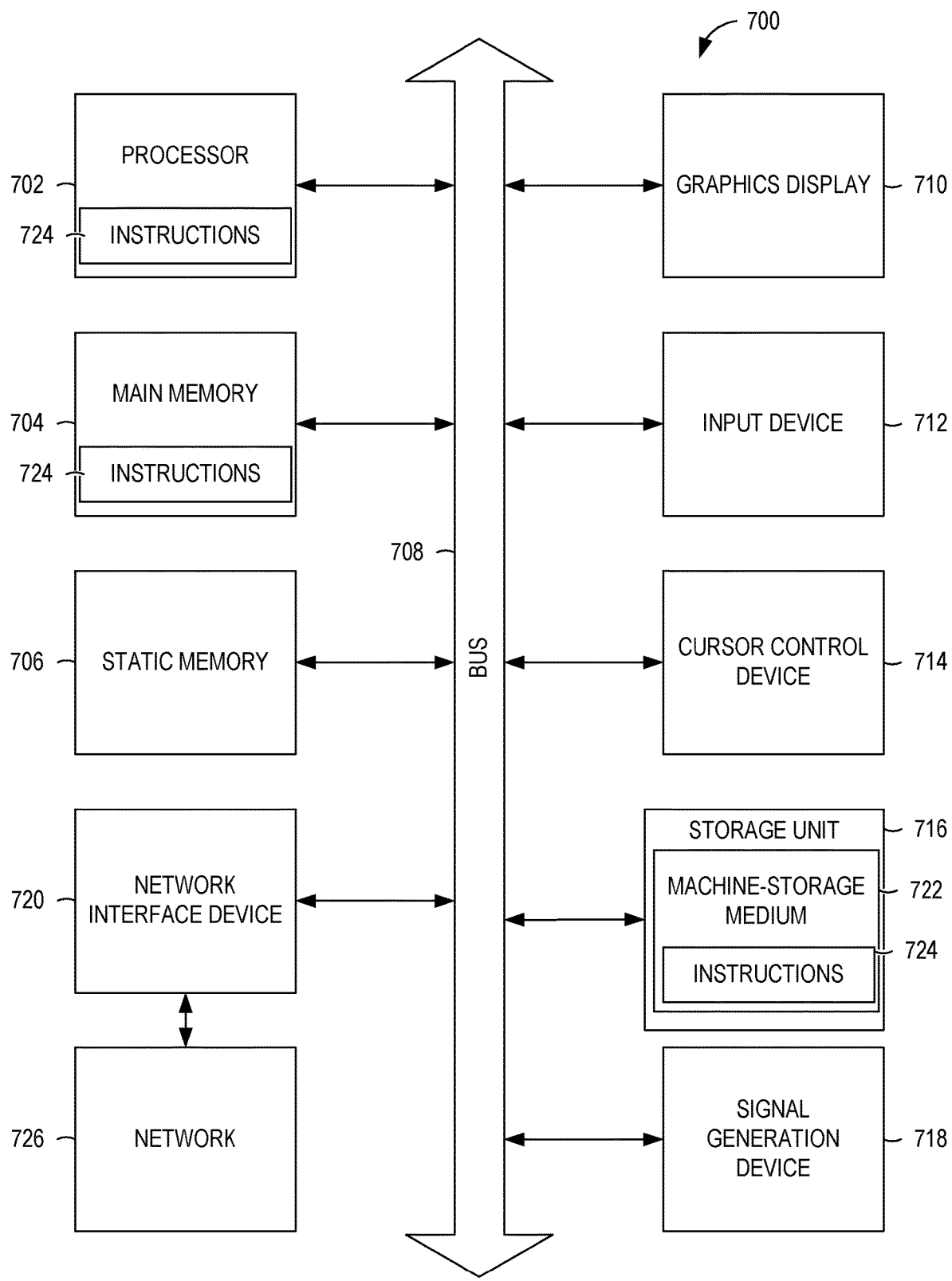
FIG. 7 is a block diagram illustrating components of a machine, according to some example embodiments, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 5 to FIG. 6. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for monitoring and managing a health of a data ingestion pipeline. The method comprises ingesting, through the ingestion pipeline, a plurality of content elements from a source to a destination, the ingestion pipeline comprising a plurality of nodes between the source and the destination; detecting, by a data management system, a gap in the ingestion pipeline, the gap indicating a difference associated with a content element of the plurality of content elements between a first node and a second node of the ingestion pipeline; and in response to detecting the gap, automatically triggering, by the data management system, reingesting of the content element from the first node.

In example 2, the subject matter of example 1 can optionally include wherein the first node is the source and the second node is the destination; and the triggering the reingesting comprises causing the reingesting to occur from the source.

In example 3, the subject matter of any of examples 1-2 can optionally include wherein at least one of the first node and the second node comprise a node between the source and the destination.

In example 4, the subject matter of any of examples 1-3 can optionally include scanning the plurality of content elements at the source; scanning items at the destination; and comparing the scan of the plurality of content elements at the source to the scan of the items at the destination, wherein the comparing detects the gap.

In example 5, the subject matter of any of examples 1-4 can optionally include wherein the gap indicates that the content element is missing at the destination or that a version of the content element is mismatched between the source and the destination.

In example 6, the subject matter of any of examples 1-5 can optionally include analyzing index logs and scans of the source and destination; and based on the analyzing, determining an item comparison completeness that indicates a health of the ingestion pipeline.

In example 7, the subject matter of any of examples 1-6 can optionally include generating and causing display of a dashboard that provides a graphical representation of the health of the ingestion pipeline from the source to the destination and graphical representations of the health of the ingestion pipeline between each node of the ingestion pipeline.

In example 8, the subject matter of any of examples 1-7 can optionally include wherein the detecting the gap comprises accessing a log associated with the content element; and based on the log, detecting that the content element is present in the first node and missing in the second node resulting in the gap.

In example 9, the subject matter of any of examples 1-8 can optionally include wherein the detecting the gap comprises accessing a log associated with the content element; and based on the log, detecting that a version of the content element at the first node is different from a version of the content element at the second node resulting in the gap.

In example 10, the subject matter of any of examples 1-9 can optionally include wherein the detecting the gap comprises accessing a log associated with the content element; and based on the log, detecting that the content element is deleted at the first node but is still present at the second node resulting in the gap.

In example 11, the subject matter of any of examples 1-10 can optionally include determining whether the gap is a result of a system issue; and based on a determination that the gap is a result of the system issue, triggering a repair to a component causing the system issue prior to the reingesting of the content element from the first node.

Example 12 is a system for monitoring and managing a health of a data ingestion pipeline. The system comprises one or more hardware processors and a memory storing instructions that, when executed by the one or more hardware processors, cause the one or more hardware processors to perform operations comprising ingesting, through the ingestion pipeline, a plurality of content elements from a source to a destination, the ingestion pipeline comprising a plurality of nodes between the source and the destination; detecting, by a data management system, a gap in the ingestion pipeline, the gap indicating a difference associated with a content element of the plurality of content elements between a first node and a second node of the ingestion pipeline; and in response to detecting the gap, automatically triggering, by the data management system, reingesting of the content element from the first node.

In example 13, the subject matter of example 12 can optionally include wherein the operations further comprise scanning the plurality of content elements at the source; scanning items at the destination; and comparing the scan of the plurality of content elements at the source to the scan of the items at the destination, wherein the comparing detects the gap.

In example 14, the subject matter of any of examples 12-14 can optionally include wherein the gap indicates that the content element is missing at the destination or that a version of the content element is mismatched between the source and the destination.

In example 15, the subject matter of any of examples 12-14 can optionally include wherein the operations further comprise analyzing index logs and scans of the source and destination; and based on the analyzing, determining an item comparison completeness that indicates a health of the ingestion pipeline.

In example 16, the subject matter of any of examples 12-15 can optionally include wherein the operations further comprise generating and causing display of a dashboard that provides a graphical representation of the health of the ingestion pipeline from the source to the destination and graphical representations of the health of the ingestion pipeline between each node of the ingestion pipeline.

In example 17, the subject matter of any of examples 12-16 can optionally include wherein the detecting the gap comprises accessing a log associated with the content element; and based on the log, detecting that the content element is present in the first node and missing in the second node resulting in the gap.

In example 18, the subject matter of any of examples 12-17 can optionally include wherein the detecting the gap comprises accessing a log associated with the content element; and based on the log, detecting that a version of the content element at the first node is different from a version of the content element at the second node resulting in the gap.

In example 19, the subject matter of any of examples 12-18 can optionally include wherein the detecting the gap comprises accessing a log associated with the content element; and based on the log, detecting that the content element is deleted at the first node but is still present at the second node resulting in the gap.

Example 20 is a storage medium comprising instructions which, when executed by one or more hardware processors of a machine, cause the machine to perform operations for monitoring and managing a health of a data ingestion pipeline. The operations comprise ingesting, through the ingestion pipeline, a plurality of content elements from a source to a destination, the ingestion pipeline comprising a plurality of nodes between the source and the destination; detecting, by a data management system, a gap in the ingestion pipeline, the gap indicating a difference associated with a content element of the plurality of content elements between a first node and a second node of the ingestion pipeline; and in response to detecting the gap, automatically triggering, by the data management system, reingesting of the content element from the first node.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   ingesting, through a data ingestion pipeline, a plurality of content elements from a source to a destination, the ingestion pipeline comprising a plurality of nodes between the source and the destination;
   detecting, by a data management system, a gap in the ingestion pipeline, the gap indicating a difference associated with a content element of the plurality of content elements between a first node and a second node of the ingestion pipeline;
   in response to detecting the gap, determining whether the content element is found at the second node;
   based on the content element being found at the second node, determining whether an issue is a system-based issue or a single issue; and
   automatically triggering, by the data management system, reingesting of the content element from the first node based on the issue being the single issue or in response to a repair performed on a component or machine associated with the ingestion pipeline based on the system-based issue.

2. The method of claim 1, wherein:
   the first node is the source and the second node is the destination; and
   the triggering the reingesting comprises causing the reingesting to occur from the source.

3. The method of claim 1, wherein at least one of the first node and the second node comprise a node between the source and the destination.

4. The method of claim 1, further comprising:
   scanning the plurality of content elements at the source;
   scanning items at the destination; and
   comparing the scan of the plurality of content elements at the source to the scan of the items at the destination, wherein the comparing detects the gap.

5. The method of claim 4, wherein the gap indicates that the content element is missing at the destination or that a version number of the content element is mismatched between the source and the destination.

6. The method of claim 1, further comprising:
   analyzing index logs and scans of the source and destination; and
   based on the analyzing, determining an item comparison completeness that indicates a health of the ingestion pipeline.

7. The method of claim 6, further comprising:
   generating and causing display of a dashboard that provides a graphical representation of the health of the ingestion pipeline from the source to the destination and graphical representations of the health of the ingestion pipeline between each node of the ingestion pipeline.

8. The method of claim 1, wherein the detecting the gap comprises:
   accessing a log associated with the content element; and based on the log, detecting that the content element is present in the first node and missing in the second node resulting in the gap.

9. The method of claim 1, wherein the detecting the gap comprises:
accessing a log associated with the content element; and
based on the log, detecting that a version number of the content element at the first node is different from a version number of the content element at the second node resulting in the gap.

10. The method of claim 1, wherein the detecting the gap comprises:
accessing a log associated with the content element; and
based on the log, detecting that the content element is deleted at the first node but is still present at the second node resulting in the gap.

11. The method of claim 1, further comprising:
based on a determination that the gap is a result of the system-based issue, generating an alert to a further system to perform the repair to the component or machine causing the system-based issue prior to the reingesting of the content element from the first node.

12. A system comprising:
one or more hardware processors; and
a memory storing instructions that, when executed by the one or more hardware processors, cause the one or more hardware processors to perform operations comprising:
ingesting, through a data ingestion pipeline, a plurality of content elements from a source to a destination, the ingestion pipeline comprising a plurality of nodes between the source and the destination;
detecting, by a data management system, a gap in the ingestion pipeline, the gap indicating a difference associated with a content element of the plurality of content elements between a first node and a second node of the ingestion pipeline;
in response to detecting the gap, determining whether the content element is found at the second node;
based on the content element being found at the second node, determining whether an issue is a system-based issue or a single issue; and
automatically triggering, by the data management system, reingesting of the content element from the first node based on the issue being the single issue or in response to a repair performed on a component or machine associated with the ingestion pipeline based on the system-based issue.

13. The system of claim 12, wherein the operations further comprise:
scanning the plurality of content elements at the source;
scanning items at the destination; and
comparing the scan of the plurality of content elements at the source to the scan of the items at the destination, wherein the comparing detects the gap.

14. The system of claim 13, wherein the gap indicates that the content element is missing at the destination or that a version number of the content element is mismatched between the source and the destination.

15. The system of claim 12, wherein the operations further comprise:
analyzing index logs and scans of the source and destination; and
based on the analyzing, determining an item comparison completeness that indicates a health of the ingestion pipeline.

16. The system of claim 15, wherein the operations further comprise:
generating and causing display of a dashboard that provides a graphical representation of the health of the ingestion pipeline from the source to the destination and graphical representations of the health of the ingestion pipeline between each node of the ingestion pipeline.

17. The system of claim 12, wherein the detecting the gap comprises:
accessing a log associated with the content element; and
based on the log, detecting that the content element is present in the first node and missing in the second node resulting in the gap.

18. The system of claim 12, wherein the detecting the gap comprises:
accessing a log associated with the content element; and
based on the log, detecting that a version number of the content element at the first node is different from a version number of the content element at the second node resulting in the gap.

19. The system of claim 12, wherein the detecting the gap comprises:
accessing a log associated with the content element; and
based on the log, detecting that the content element is deleted at the first node but is still present at the second node resulting in the gap.

20. A machine-storage medium comprising instructions which, when executed by one or more hardware processors of a machine, cause the machine to perform operations comprising:
ingesting, through a data ingestion pipeline, a plurality of content elements from a source to a destination, the ingestion pipeline comprising a plurality of nodes between the source and the destination;
detecting, by a data management system, a gap in the ingestion pipeline, the gap indicating a difference associated with a content element of the plurality of content elements between a first node and a second node of the ingestion pipeline;
in response to detecting the gap, determining whether the content element is found at the second node;
based on the content element being found at the second node, determining whether an issue is a system-based issue or a single issue; and
automatically triggering, by the data management system, reingesting of the content element from the first node based on the issue being the single issue or in response to a repair performed on a component or machine associated with the ingestion pipeline based on the system-based issue.

\* \* \* \* \*